(12) United States Patent
Lu et al.

(10) Patent No.: US 11,447,619 B2
(45) Date of Patent: Sep. 20, 2022

(54) THERMOPLASTIC ELASTOMER COMPOSITION

(71) Applicant: Polymax TPE LLC, Waukegan, IL (US)

(72) Inventors: Yun Martin Lu, Waukegan, IL (US); Xin Zhang, Waukegan, IL (US); Xiaofeng Zheng, Waukegan, IL (US); Qianqian Li, Waukegan, IL (US)

(73) Assignee: POLYMAX TPE LLC, Waukegan, IL (US)

( * ) Notice: Subject to any disclaimer, the term of this patent is extended or adjusted under 35 U.S.C. 154(b) by 161 days.

(21) Appl. No.: 16/855,888

(22) Filed: Apr. 22, 2020

(65) Prior Publication Data

US 2020/0332096 A1 Oct. 22, 2020

Related U.S. Application Data

(60) Provisional application No. 62/837,168, filed on Apr. 22, 2019.

(51) Int. Cl.
| | | |
|---|---|---|
| *C08L 23/06* | (2006.01) | |
| *C08L 53/00* | (2006.01) | |
| *C08L 91/00* | (2006.01) | |
| *C08K 5/00* | (2006.01) | |

(52) U.S. Cl.
CPC .............. *C08L 23/06* (2013.01); *C08K 5/005* (2013.01); *C08L 53/00* (2013.01); *C08L 91/00* (2013.01); *C08L 2205/03* (2013.01); *C08L 2207/04* (2013.01); *C08L 2207/066* (2013.01)

(58) Field of Classification Search
CPC ...... C08L 53/00; C08L 23/0815; C08L 91/00; C08L 91/005
See application file for complete search history.

(56) References Cited

U.S. PATENT DOCUMENTS

| | | | |
|---|---|---|---|
| 5,334,646 A | 8/1994 | Chen | |
| 5,459,193 A * | 10/1995 | Anderson | A61L 15/58 524/505 |
| 5,847,051 A * | 12/1998 | Hwo | C08L 53/02 524/505 |
| 6,312,824 B1 * | 11/2001 | Philippoz | C08L 67/025 428/480 |
| 6,797,766 B2 * | 9/2004 | Cordova | C09J 153/02 524/505 |
| 2002/0049276 A1 | 4/2002 | Zwick | |
| 2003/0052431 A1 | 3/2003 | Shah et al. | |
| 2010/9316803 | 12/2010 | Uang | |
| 2011/0256332 A1 * | 10/2011 | Kim | C08L 53/00 428/35.7 |
| 2013/0324653 A1 * | 12/2013 | Bollard | C08F 265/06 524/251 |
| 2016/0264785 A1 * | 9/2016 | Pohl | C04B 14/28 |
| 2018/0022914 A1 * | 1/2018 | Gu | C08L 25/00 428/515 |
| 2018/0340059 A1 * | 11/2018 | Abubakar | C08J 9/365 |
| 2021/0122914 A1 * | 4/2021 | Gu | C08L 53/02 |

FOREIGN PATENT DOCUMENTS

CN 102675807 A * 9/2012

OTHER PUBLICATIONS

International Search Report, dated Jul. 24, 2020, PCT/US20/29366.

* cited by examiner

*Primary Examiner* — Mark S Kaucher
(74) *Attorney, Agent, or Firm* — Frank Gao, Esq.

(57) ABSTRACT

A thermoplastic elastomer composition and method of making the thermoplastic elastomer are disclosed. The thermoplastic elastomer may comprise a polymer blend. The polymer bland may comprise a non-crosslinked elastomer, oil, polyethylene, and antioxidant. The oil may be from about 15 wt. % to about 50 wt. % oil. The polyethylene may be from about 3 wt. % to about 30 wt. %. The antioxidant may be from about 0 to about 0.5 wt. %.

24 Claims, No Drawings

THERMOPLASTIC ELASTOMER COMPOSITION

RELATED PATENT APPLICATIONS

This application claims priority date of U.S. provisional application No. 62/837,168, which was filed on Apr. 22, 2019. The entire disclosures of which are incorporated by reference herein.

TECHNICAL FIELD

The present disclosure relates generally to thermoplastic elastomeric compositions and more specifically to thermoplastic elastomeric compositions with low compression set and good melt strength.

BACKGROUND

A problem that is becoming more evident these days within the wine industry is that a great number of traditionally naturally sealed wines are damaged by cork that is tainted, ill-fitting or deteriorated.

It is estimated that around 5-10% of all wines have been be affected to some degree and in some cases the wine will have to be discarded because the cork is "corked", meaning that the porous and imperfect material (wood bark) was tainted or infected, and during its contact with the wine, it altered its chemistry with damaging results to the quality of the wine. The "corked wine" will be affected and depending of the seriousness of the taint, it could show symptoms that go from musty smell, to a change in the tastes of the wine, which becomes flat and bodiless.

Therefore, there is a need to develop synthetic wine cork with elastomeric materials that have low compression set and good melt strength.

SUMMARY

According to a first aspect, the thermoplastic elastomer may comprise a polymer blend. The polymer blend may comprise a non-crosslinked elastomer, oil, polyethylene, and anti-oxidant. The oil may be from about 15 wt. % to about 50 wt. %. The polyethylene may be from about 3.0 wt. % to about 30 wt. %. The anti-oxidant may be from about 0 to about 0.5 wt. %.

In certain aspects, the oil comprises mineral oil.

In certain aspects, the non-crosslinked elastomer may comprise styrenic block copolymer.

In certain aspects, the styrenic block copolymer may be selected from a group consisting of styrene-ethylene-butadiene-styrene polymer, styrene-ethylene butylene-styrene, styrene-ethylene propylene-styrene (SEPS), hydrogenated polybutadiene, hydrogenated polyisoprene, hydrogenated styrene-isoprene random copolymer, styrene-ethylene propylene (SEP) block copolymer, styrene-ethylene ethylene propylene-styrene (SEEPS), and hydrogenated styrene-butadiene random copolymer.

In certain aspects, the styrenic block copolymer may comprise styrene-ethylene-butylene-styrene polymer.

In certain aspects, the styrenic block copolymer may comprise about 20 wt. % to about 50 wt. % styrene-ethylene-butylene-styrene polymer.

In certain aspects, the styrene-ethylene-butylene-styrene polymer total molecular weight is from 100,000 to 440,000 g/mol.

In certain aspects, the mineral oil may comprise paraffinic oil.

In certain aspects, the styrene-ethylene-butylene-styrene polymer total molecular weight is from 200,000 g/mol to 440,000 g/mol. In certain aspects, the polyethylene may comprise linear low density polyethylene (LLDPE).

In certain aspects, the styrene-ethylene-butylene-styrene polymer total molecular weight is from 240,000 g/mol to 440,000 g/mol. In certain aspects, linear low density polyethylene has melt flow index of about 0.5 to about 10.0 g/10 min, measured at 230° C., employing 2.16 kilogram (kg) weight.

In certain aspects, the thermoplastic elastomer has Shore A hardness from about 30 to 95A.

In certain aspects, the thermoplastic elastomer has a weight percent ratio of non-crosslinked elastomer to oil, when present, from about 0.4 to about 2.5.

In certain aspects, the weight percent ratio is from about 0.7 to about 1.5.

In certain aspects, the thermoplastic elastomer has melt viscosity at shear rate of 67 1/s of about 200 to about 2000 Pa·s, measured at 200° C.

In certain aspects, the thermoplastic elastomer has melt viscosity at shear rate of 67 1/s of about 500 to about 1300 Pa·s, measured at 200° C.

In certain aspects, the thermoplastic elastomer has melt viscosity at shear rate of 67 1/s of about 200 to about 500 Pa·s, measured at 200° C.

In certain aspects, the thermoplastic elastomer has melt viscosity at shear rate of 67 1/s of about 700 to about 1100 Pa·s, measured at 200° C.

In certain aspects, the non-crosslinked elastomer total molecular weight is from about 100,000 to about 440,000 g/mol.

In certain aspects, the non-crosslinked elastomer total molecular weight is from about 200,000 to about 400,000 g/mol.

According to a second aspect, a thermoplastic elastomer may comprise a polymer blend. The polymer blend may comprise a styrenic block copolymer, oil, polyethylene, anti-oxidant. The oil may be from about 15 wt. % to about 50 wt, %. The polyethylene may be from about 3 wt. % to about 30 wt, %. The anti-oxidant may be from about 0 to about 0.5 wt. % anti-oxidant. The thermoplastic elastomer may have melt viscosity at shear rate of 67 1/s of about 200 to about 2000 measured at about 200° C. According to a second aspect, a thermoplastic elastomer may comprise a polymer blend. The polymer blend may comprise a styrenic block copolymer, oil, polyethylene, and anti-oxidant. The oil may be from about 15 wt. % to about 50 wt. %. The polyethylene may be from about 3 wt. % to about 30 wt. %. The anti-oxidant may be from about 0 to about 0.5 wt. % anti-oxidant. The thermoplastic elastomer may have a weight percent ratio of styrenic block copolymer to oil, when present, from about 0.4 to about 2.5. The styrenic block copolymer may be selected from a group consisting of styrene-ethylene-butylene-styrene polymer, styrene-ethylene butylene-styrene, styrene-ethylene propylene-styrene (SEPS), styrene-ethylene propylene (SEP) block copolymer, styrene-ethylene ethylene propylene-styrene (SEEPS), and hydrogenated styrene-butadiene random copolymer.

DETAILED DESCRIPTION

In the following description, well-known functions or constructions are not described in detail because they may obscure the disclosure in unnecessary detail. For this disclosure, the following terms and definitions shall apply. 1271 Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Additionally, variations to the disclosed embodiments can be understood and effected by the skilled person in practicing the claimed disclosure, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

Also, two or more steps may be performed concurrently or with partial concurrence. Further, the steps of the method may be performed in an order different from what has been disclosed. Such variation will depend on the process hardware systems chosen and on designer choice. All such variations are within the scope of the disclosure. Additionally, even though the disclosure has been described with reference to specific exemplifying embodiments thereof, many different alterations, modifications and the like will become apparent for those skilled in the art.

Embodiments include thermoplastic elastomeric material compositions, processes for preparing the compositions and articles of manufacture prepared from the compositions. In one embodiment, the thermoplastic elastomeric composition is provided comprising a polymer blend of about 15% to about 50% styrene-ethylene-butadiene-styrene (SEBS) polymer; from about 15% to about 50% oil; from about 3.0% to about 30% polyethylene; and from about 0 to about 0.5% anti-oxidant.

As used herein, the term "polymer" refers to the product of a polymerization reaction, and is inclusive of homopolymers, copolymers, terpolymers, etc.

As used herein, unless specified otherwise, the term "copolymer(s)" refers to polymers formed by the polymerization of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, when a polymer is referred to as "comprising a monomer," the monomer is present in the polymer in the polymerized form of the monomer or in the derivative form the monomer.

As used herein, "molecular weight" means weight average molecular weight ("Mw"). Mw is determined using Gel Permeation Chromatography. Molecular Weight Distribution ("MWD") may be defined or measured as Mw divided by number average molecular weight ("Mn"). (For more information, see U.S. Pat. No. 4,540,753 to Cozewith et al. and references cited therein, and in Ver Strate et al., 21 MACROMOLECULES, pp. 3360-3371 (1998)). The "Mz" value is the high average molecular weight value, calculated as discussed by A. R. Cooper in Concise Encyclopedia of Polymer Science and Engineering, pp. 638-639 (J. I. Kroschwitz, ed. John Wiley & Sons 1990).

The term "active agent" refers to a substance capable of delivering special activity or function to users. Suitable active agents may be in a variety of geometric forms including discrete particles, fibers, flakes, rods, spheres, needles, particles coated with fibers and the like.

The term "compression" refers to the process or result of pressing by applying a force on an object, thereby increasing the density of the object.

The terms "elastomeric," "elastomer," "elastic," and other derivatives of "elastomeric" are used interchangeably and refer to materials having elastomeric or rubbery properties. Elastomeric materials, such as thermoplastic elastomers and thermoplastic vulcanizates, are generally capable of recovering their shape after deformation when the deforming force is removed. Specifically, as used herein, elastomeric is meant to be that property of any material which upon application of an elongating force, permits that material to be stretchable to a stretched length which is at least about 25 percent greater than its relaxed length, and that will cause the material to recover at least 40 percent of its elongation upon release of the stretching elongating force. A hypothetical example which would satisfy this definition of an elastomeric material in the X-Y planar dimensions would be a one (1) inch sample of a material which is elongatable to at least 1.25 inches and which, upon being elongated to 1.25 inches and released, will recover to a length of not more than 1.15 inches. Many elastomeric materials may be stretched by much more than 25 percent of their relaxed length, and can recover to substantially their original relaxed length upon release of the stretching, elongating force. In addition to a material being elastomeric in the described X-Y planar dimensions of a structure, including a web or sheet, the material can be elastomeric in the Z planar dimension. Specifically, when a structure is compressively loaded, it displays elastomeric properties and will essentially recover to its original position upon removal of the load. Compression set is sometimes used to help describe such elastic recovery. When compression is applied to an elastomeric structure, the structure may display elastomeric properties and then recover to near its original position upon relaxation.

The term "extensible" refers to a material that is generally capable of being extended or otherwise deformed, but which does not recover a significant portion of its shape after the extension or deforming force is removed.

The term "flexible" refers to the ability of a material to bend under an imposed load such that its Bending Modulus at 0.5 mm deflection is 1000 g/mm or lower as measured by the Bending Modulus Test.

The term "thermoplastic" describes a material that softens and/or flows when exposed to heat and which substantially returns to its original hardened condition when cooled to room temperature.

As used herein, "weight percent" or "wt. %", unless noted otherwise, means a percent by weight of a particular component based on the total weight of the composition containing the component. For example, if a mixture contains three pounds of sand and one pound of sugar, then the sand comprises 75 wt. % (3 lbs. sand/4 lbs. total mixture) of the mixture and the sugar 25 wt. %.

The term "crystalline" if employed, refers to a polymer or a segment that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

As used herein, Melt Flow Rates ("MFR") may be determined in accordance with ASTM D1238 at 230° C. and 2.16 kg weight.

As used herein, Melt Indices ("MI") or Melt Flow Index/Indices, also may be known as Melt Flow Rates, which may be determined in accordance with ASTM D1238 at 190° C. and 2.16 kg weight.

Unless otherwise indicated, all numbers expressing quantities of ingredients, properties such as molecular weight, reaction conditions, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of reported significant digits and by applying ordinary rounding techniques.

Notwithstanding that the numerical ranges and parameters set forth the broad scope of the invention are approximations, the numerical values set forth in specific examples are reported as precisely as possible. Any numerical value, however, inherently contain certain errors necessarily resulting from the standard deviation found in their respective testing measures.

The thermoplastic elastomeric compositions may comprise a polymer blend. The polymer blend may comprise a non-crosslinked elastomer, oil, polyethylene, and an antioxidant.

Preferred styrenic block copolymers are those having the formulae: ABA, (A-B) nX, ABAB' or ABA'B' respectively, wherein A and A' represent a poly (monovinyl aromatic) block and B and B' represent hydrogenated poly (conjugated diene(s)) blocks, wherein n is an integer $\geq 2$ and wherein X is the remainder of a coupling agent. It will be appreciated that the blocks A and A', and B and B' respectively are equal or different from each other, in that the blocks A are larger than the blocks A' and the blocks B are larger than B' or B and B' are equal.

Most preferred block copolymers have the formulae ABA or (A-B) nX, wherein A represents a polymer block of one or more monovinyl aromatic monomers selected from styrene, C1-C4 alkyl styrene and C1-C4dialkylstyrene and in particular styrene, α-methyl styrene, o-methyl styrene or p-methyl styrene, 1,3-dimethylstyrene, p-tert-butyl styrene or mixtures thereof and most preferably styrene only, wherein B represents a polymer block of one or more conjugated diene monomers containing from 4 to 8 carbon atoms, such as 1,3-butadiene, 2-methyl-1,3-butadiene (isoprene), 2,3-dimethyl-1,3-butadiene or mixtures thereof, and preferably butadiene or isoprene and most preferably butadiene.

Preferred block copolymers ABA or (A-B)$_n$X comprise substantially pure poly(styrene) blocks, each having a true molecular weight in the range of from 3 kg/mole to 50 kg/mole while the total apparent molecular weight is in the range of from 70 to 700 kg/mol and preferably from 100 to 500 kg/mol. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are apparent molecular weights, also known as styrene equivalent molecular weights. The styrenic equivalent molecular weight may be converted to true molecular weight when the styrenic content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

Preparation methods for such polymers may be found in U.S. Pat. Nos. 3,231,635, 3,231,635, 3,231,635, 3,231,635, and 3,231,635, in U.S. Pat. No. 3,231,635. U.S. Pat. No. 3,231,635. U.S. Pat. No. 3,231,635, and in U.S. Pat. No. 3,231,635. Processes for the selective hydrogenation of the B blocks were known from e.g. U.S. Pat. No. 3,231,635. U.S. Pat. No. 3,231,635. U.S. Pat. No. 3,231,635. U.S. Pat. Nos. 3,231,635, and 3,231,635. The disclosures of these before mentioned documents are herein incorporated by reference.

Suitable representatives of said most preferred block copolymers are those available under the trade names KRATON®, SEPTON™ and TUFTEC™, for instance KRATON G 1650, KRATON G 1654. KRATON G 1651, KRATON G 1652, KRATON G 1633, KRATON G 1641, KRATON G 1657, KRATON A 1535, KRATON A 1636, KRATON GRP 6924, SEPTON 4055, SEPTON 4077, TUFTEC H 1272, TSRC Taipol 6150, Taipol 6154, Taipol 6151, Taipol 6159, Sinopec 503T, 602T and 604T comprising usually poly (conjugated diene) blocks being hydrogenated until less than 10% of the original ethylenic unsaturation.

The block copolymers that may be used in this embodiment may be selected from the group of styrene-ethylene butylene-styrene (SEBS), styrene-ethylene propylene-styrene (SEPS), hydrogenated polybutadiene, hydrogenated polyisoprene, hydrogenated styrene-isoprene random copolymer, styrene-ethylene propylene (SEP) block copolymer, styrene-ethylene ethylene propylene-styrene (SEEPS) and hydrogenated styrene-butadiene random copolymer.

The hydrogenation of random diene copolymers are described by authors E. W. Duck, J. R. Hawkins, and J. M. Locke, in Journal of the IRI, 6, 19, 1972, which may be used as the highly saturated elastomer in this invention and is incorporated herein as a reference. The saturated triblock polymers, SEBS and SEPS, with styrenic end blocks are also used in this invention as the saturated elastomers. SEBS and SEPS are obtained on the hydrogenation of triblock copolymers of styrenic and butadiene or styrenic and isoprene and are known to be commercially available. Some commercially available examples of such elastomers include Kraton G series polymers. U.S. Pat. Nos. 3,686,364 and 3,865,776 give some examples of block copolymers that may be used in the practice of this invention and are incorporated herein by reference. It is highly preferred that the highly saturated elastomer be SEBS having a bound styrenic content that is within the range of 15 weight percent to about 60 weight percent.

It is possible to use the saturated block copolymers that are modified versions of SEBS. Such modified block copolymers additionally have a substantial number of styrenic units that are randomly distributed in the rubber mid blocks of ethylene and butylene. These modified saturated block copolymers are supplied under Kraton 'A' series. Saturated block copolymers grades as mentioned in TPE 2003 RAPRA Conference Proceedings, Brussels, Belgium, Sep. 16-17, 2003, Paper 18, Page 157, and Paper 21, page 181 may also be used and are incorporated herein by reference.

In one embodiment, polystyrene-ethylene-butadiene-styrene (SEBS) block copolymer may include suitable SEBS copolymers that include those with a block styrenic content of about 10 to about 35 wt. % based on the total SEBS copolymer, and have Shore A hardness values of about 40 to about 80.

The thermoplastic elastomeric may comprise about 0.1 wt. % to about 40 wt. % polyethylene, more preferably about 1.0 wt. % to about 35 wt. % polyethylene, more preferably 3.0 wt. % to about 30 wt. % polyethylene, more preferably, 4.0 wt. % to about 25 wt. % polyethylene. Suitable polyethylene may include high density polyethylene (HDPE), low density polyethylene (LDPE), and linear low density polyethylene (LLDPE). In one embodiment, high molecular weight polyethylene compounds may be used. In one embodiment, suitable linear low density polyethylene (LLDP) generally have melt indices of about 0.5 to about 10.0 g/10 min, measured at 230° C., employing 2.16 kilogram (kg) weight.

The thermoplastic elastomeric compositions may comprise up to about 60% wt. %, preferably about 15 wt. % to about 55 wt. % oil, more preferably about 15 wt. % to about 50 wt. % oil, for example. Suitable oil may include mineral oil. Suitable mineral oil may include paraffinic oils (ASTM D2226 TYPE 104), or naphthenic oils (ASTM 103 & 104A). All above oils represent different cuts from the distillation of crude oil.

In addition, the thermoplastic elastomeric compositions may comprise up to about 2 wt. %, preferably up to about 1 wt. % anti-oxidant, more preferably up to about 0.5% wt. % antioxidant. Suitable anti-oxidant may include hindered phenols, thiol compounds, amines or phosphites.

The thermoplastic elastomeric compositions also may comprise up to about 3 wt. % colorant. Suitable color pigments are known to those skilled in the art and the exact amount of color pigment is readily empirically determined based on the desired color characteristic of the composition and the finished product.

The thermoplastic elastomeric compositions may also comprise up to about 3 wt. %, preferably about 1 wt. %, of a processing aid such a metal stearate, soaps, an ultra-high molecular weight siloxane polymer or lubricants, in order to assist proper flow of the polymer melt through the injection molded barrel and dies and result in molded parts with good surface characteristics. A suitable example is zinc stearate.

The thermoplastic elastomeric compositions may also optionally comprise stabilizers, such as heat stabilizer and/or light stabilizer, such as ultraviolet light stabilizers, as well as combinations of heat and light stabilizers. Heat stabilizers, like antioxidants, include phenolics, amines, phosphites, and the like, as well as combinations comprising at least one of the foregoing heat stabilizers. Light stabilizers include low molecular weight (having number-average molecular weights less than about 1,000 AMU) benzophenones or hindered amines, high molecular weight (having number-average molecular weights greater than about 1,000 AMU) hindered amines, benzotriazoles, hydroxyphenyl triazines, and the like, as well as combinations comprising at least one of the foregoing light stabilizers. Optionally, various additives known in the art may be used as needed to impart various properties to the composition, such as heat stability, stability upon exposure to ultraviolet wavelength radiation, long-term durability, and processability. The exact amount of stabilizer is readily empirically determined by the reaction employed and the desired characteristics of the finished article, with up to about 3 wt. % possible, 1 wt. % preferred.

The thermoplastic elastomeric compositions and articles formed thereof may be prepared in a process. In the present process, the polymer blend comprised of a thermoplastic elastomer material, such as styrene-ethylene-butadiene-styrene (SEBS) polymer in powder form, is pre-mixed with polyethylene, anti-oxidant, and oil using a high shear mixer or other such device to form a tumble mixed blend of the composition prior to being disposed into the hopper of the twin screw extruder, through which the premix is melted, mixed and pelletized in to thermoplastic elastomer pellets. The formed Thermoplastic elastomer can be processed into different products such as wine corks, toothpicks and others by extrusion process, injection molding and other polymer processing processes.

EXPERIMENTAL DETAILS

Mixing in a continuous process typically occurs in a twin-screw extruder that was elevated to a temperature that was sufficient to melt the polymer matrix with addition of all additives at the feed-throat, or by injection or side-feeders downstream. Extruder speeds ranged from about 50 to about 1200 revolutions per minute (rpm), and preferably from about 300 to about 700 rpm, for example. Typically, the output from the extruder was pelletized for later processing. By the use of a twin-screw extruder, the blending components as shown hereunder were kneaded at from about 160° C. to about 220° C., and extruded into strands, which were then cut into pellets. For example, a lab twin screw extruder included 9 zones, with zone 1 about 160° C., zone 2 about 180° C., zone 3 about 210° C., zone 4 about 210° C., zone 5 about 200° C., zone 6 about 180° C., zone 7 about 160° C., zone 8 about 160° C., zone 9 about 160° C. The pelletizer temperature may be 170° C.

Examples 1-4

A composition of pellet form was prepared in accordance with the compounding recipe shown in Table 1, using a twin-screw extruder under conditions discussed in experiment details. The pellets were injection-molded to prepare a square sheet of 10 cm×10 cm. The sheet was cut by a dumbbell cutter to prepare test pieces for measurement. In the preparation of the composition in the twin-screw extruder, Components were dry-blended; the blend was passed through the extruder. The results are shown in Table 2.

As is clear from Table 2, the Elastomer Compositions of this embodiment are elastomers having a low compression set, excellent elasticity and excellent dynamic properties.

TABLE 1

| Raw Material Name | 14A pphr | 14A % | 14B pphr | 14B % | 14C pphr | 14C % | 1A phbr | 1A % |
|---|---|---|---|---|---|---|---|---|
| SEBS 1633 | 100.00 | 31.50 | 100.00 | 31.50 | 100.00 | 30.35 | 100.00 | 32.00 |
| Drakeol 600 | 121.00 | 38.12 | 121.00 | 38.21 | 121.00 | 36.73 | 121.00 | 38.72 |
| Polypropylene 6523 | 23.00 | 7.25 | 0.00 | 0.00 | 0.00 | 0.00 | 0.00 | 0.00 |
| Polypropylene Inspire 114 | 0.00 | 0.00 | 23.00 | 7.25 | 0.00 | 0.00 | 0.00 | 0.00 |
| Polyastolyn 290 | 10.00 | 3.15 | 10.00 | 3.15 | 10.00 | 3.04 | 10.00 | 3.20 |
| LLDPE SP4030 | 23.00 | 7.25 | 23.00 | 7.25 | 58.00 | 17.61 | 0.00 | 0.00 |
| Armoslip E | 0.25 | 0.08 | 0.25 | 0.08 | 0.25 | 0.08 | 0.25 | 0.08 |
| Irogonox 1010 | 0.20 | 0.06 | 0.20 | 0.06 | 0.20 | 0.06 | 0.21 | 0.07 |
| Vicron 25-11 | 40.00 | 12.00 | 40.00 | 12.60 | 40.00 | 12.14 | 40.00 | 12.80 |
| Polypropylene CP360H | 0.00 | 0.00 | 0.00 | 0.00 | 0.00 | 0.00 | 41.00 | 13.12 |
| TOTAL | 317.45 | 100.00 | 317.45 | 100.00 | 329.45 | 100.00 | 312.46 | 100.00 |
| Density (gram/cm$^2$) | 0.990 | | 1.008 | | 0.997 | | 0.982 | |

TABLE 2

Group 14A, 14B, 14C, 1A test result summary

| | 14A | 14B | 14C | 1A |
|---|---|---|---|---|
| Hardness, Shore A | 61 | 62 | 64 | 60 |
| Density, g/cm$^3$ | 0.98 | 0.99 | 0.99 | 0.98 |
| Compression Set, 70° C.@22 hrs | 34.41% | 36.34% | 29.15% | 41.01% |
| Tensile Strength, MPa | 5.70 | 5.31 | 6.01 | 8.19 |
| Tensile Elongation, % | 436 | 288 | 142 | 571 |
| 100% Modulus, MPa | 2.89 | 3.63 | 4.87 | 2.66 |
| 300% Modulus, MPa | 4.46 | / | / | 4.24 |
| Viscosity(200° C.)@Shear Rats 67 1/S, Pa*s | 1095.24 | 1168.71 | 1464.54 | 653.70 |

Examples 5-9

A composition of pellet form was prepared in accordance with the compounding recipe shown in Table 3, using a twin screw extruder under conditions discussed in experiment details. The pellets were injection-molded to prepare a square sheet of 10 cm×10 cm. The sheet was cut by a dumbbell cutter to prepare test pieces for measurement. In the preparation of the composition in the twin screw extruder, Components were dry-blended; the blend was passed through the extruder. The results are shown in Table 4.

As is clear from Table 4, the Elastomer Compositions of this embodiment are elastomers having a low compression sets, excellent elasticity and good melt strength.

TABLE 3

| Raw material Name | A pphr | A % | B pphr | B % | C pphr | C % | D phbr | D % | E phbr | E % |
|---|---|---|---|---|---|---|---|---|---|---|
| SEBS 503T | 100.00 | 35.57 | 100.00 | 35.57 | 100.00 | 35.57 | 100.00 | 35.57 | 100.00 | 35.57 |
| Drakeol 34 | 121.00 | 43.04 | 121.00 | 43.04 | 121.00 | 43.04 | 121.00 | 4304 | 121.00 | 43.04 |
| LLDPE SP4030 | 30.00 | 10.67 | 15.00 | 5.34 | 0.00 | 0.00 | 45.00 | 16.01 | 60.00 | 21.34 |
| PP6523 | 30.00 | 10.67 | 45.00 | 16.01 | 60.00 | 21.34 | 15.00 | 5.34 | 0.00 | 0.00 |
| BNX1010 | 0.14 | 0.05 | 0.14 | 0.05 | 0.14 | 0.15 | 0.14 | 0.05 | 0.14 | 0.05 |
| TOTAL | 281.14 | 100.00 | 281.14 | 100.00 | 281.14 | 100.00 | 281.14 | 100.00 | 281.14 | 100.00 |

TABLE 4

| | A | B | C | D | E |
|---|---|---|---|---|---|
| Hardness, Shore A | 69 | 73 | 77 | 63 | 61 |
| Density, g/cm$^3$ | 0.88 | 0.88 | 0.88 | 0.91 | 0.91 |
| Compression Set, 70° C.@22 hours | 45.1% | 48% | 54.7% | 38.4% | 34% |
| Compression Set, 23° C.@22 hours | 18.2% | 18.8% | 22.1% | 15% | 12.7% |

TABLE 4-continued

|  | A | B | C | D | E |
|---|---|---|---|---|---|
| Tensile | | | | | |
| Tensile Strength, MPa | 5.60 | 5.65 | 7.10 | 6.36 | 6.38 |
| Tensile Elongation, % | 374 | 228 | 349 | 498 | 477 |
| 50% Modulus, MPa | 3.10 | 3.95 | 4.59 | 2.09 | 1.50 |
| 100% Modulus, MPa | 3.81 | 4.70 | 5.28 | 2.68 | 2.16 |
| 200% Modulus, MPa | 4.60 | 5.42 | 5.99 | 3.56 | 3.30 |
| 300% Modulus, MPa | 5.19 | 5.93 | 6.51 | 4.39 | 4.36 |
| Rheology | | | | | |
| Viscosity(200° C.)@Shear Rate 67 1/S, Pa*s | 810.32 | 695.22 | 575.73 | 916.81 | 1064.23 |

Examples 10-15

A composition of pellet form was prepared in accordance with the compounding recipe shown in Table 5, using a twin screw extruder under conditions discussed in experiment details. The pellets were injection-molded to prepare a square sheet of 10 cm×10 cm. The sheet was cut by a dumbbell cutter to prepare test pieces for measurement. In the preparation of the composition in the twin screw extruder, Components were dry-blended; the blend was passed through the extruder. The results are shown in Table 6.

As is clear from Table 6, the Elastomer Compositions of this embodiment are elastomers having a low hardness, compression sets, excellent elasticity, and good melt strength.

TABLE 6

| No. | Hardness, Shore A | Compression Set | testing condition | Protocol |
|---|---|---|---|---|
| 177A | 41 | 41.8 | 70° C., 22 h | ASTM D359B |
| 177B | 58 | 38 | 70° C., 22 h | ASTM D359B |
| 177C | 58 | 40.1 | 70° C., 22 h | ASTM D359B |
| 177D | 59 | 35.7 | 70° C., 22 h | ASTM D359B |
| 178A | 58 | 46.2 | 70° C., 22 h | ASTM D359B |
| 178B | 60 | 45 | 70° C., 22 h | ASTM D359B |

The embodiments of the present compositions, processes and articles made there from, although primarily described in relation to wine cork skin application, may be utilized in numerous other applications, both nonautomotive and automotive vehicle applications such as interior sheathing, including instrument panel skins, door panels, air bag covers, roof liners, and seat covers.

TABLE 5

| Raw Material Name | 177A | | 177B | | 177C | | 177D | | 178A | | 178B | |
|---|---|---|---|---|---|---|---|---|---|---|---|---|
| | pphr | % | pphr | % | pphr | % | phbr | % | phbr | % | ppbr | % |
| SEBS 1633 | 0.00 | 0.00 | 0.00 | 0.00 | 0.00 | 0.00 | 100.00 | 40.01 | | | | |
| SEBS 1651 | 100.00 | 43.49 | 100.00 | 40.01 | 100.00 | 42.56 | 0.00 | 0.00 | 100.00 | 39.69 | 100.00 | 37.32 |
| Drakeol 600 | 110.00 | 47.84 | 110.00 | 44.01 | 100.00 | 42.56 | 110.00 | 44.01 | 110.00 | 43.66 | 116.00 | 43.29 |
| Polypropylene Inspire 114 | 8.00 | 3.48 | 18.00 | 720 | 16.00 | 6.81 | 18.00 | 7.20 | | | | |
| PP 6523 | | | | | | | | | 19.00 | 7.54 | 24.00 | 8.96 |
| Alathon ® HDPE H5618 | 8.00 | 3.48 | 18.00 | 7.20 | 16.00 | 6.81 | 18.00 | 7.20 | 19.00 | 7.54 | 0.00 | 0.00 |
| Irgonox 1010 | 0.15 | 0.07 | 0.15 | 0.06 | 0.15 | 0.06 | 0.15 | 0.06 | | | | |
| BNX 1010 | | | | | | | | | 0.15 | 0.06 | 0.15 | 0.06 |
| Armoslip E | 0.50 | 0.22 | 0.50 | 0.20 | 0.50 | 0.21 | 0.50 | 0.20 | 0.50 | 0.20 | 0.20 | 0.19 |
| BNX DLTDP | 0.30 | 0.13 | 0.30 | 0.12 | 0.30 | 1.28 | 3.00 | 1.20 | 0.30 | 0.12 | 0.30 | 0.11 |
| MB50002 Silicone MASTER BATCH | 3.00 | 1.30 | 3.00 | 1.20 | 3.00 | 1.28 | 3.00 | 1.20 | 3.00 | 1.19 | 3.00 | |

It will be understood that a person skilled in the art may make modifications to the embodiments shown herein within the scope and intent of the claims. While the present invention has been described as carried out in specific embodiments thereof, it is not intended to be limited thereby but is intended to cover the invention broadly within the scope of the claims.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations may be ascertainable to those of skill in the art, Thus, it is to be understood that the invention may therefore be practiced otherwise than as specifically described above.

We claim:

1. A thermoplastic elastomer composition, comprising,
    a polymer blend comprising a sole non-crosslinked elastomer, wherein the non-cross-linked elastomer comprises styrenic block copolymer is selected from a group consisting of styrene-butadiene-styrene polymer (SBS), styrene-ethylene butylene-styrene (SEBS), styrene-isoprene-styrene (SIS), styrene-isoprene-butadiene-styrene (SIBS), styrene-ethylene propylene-styrene (SEPS), styrene-ethylene propylene (SEP) block copolymer, styrene-ethylene ethylene propylene-styrene (SEEPS), hydrogenated polybutadiene, hydrogenated polyisoprene, hydrogenated styrene-isoprene random copolymer, poly (styrene-[(butadiene)$_{1-x}$-(ethylene-co-butylene)$_x$]-styrene), wherein x is the hydrogenated fraction of the molecule, and hydrogenated styrene-butylene random, wherein the non-crosslinked elastomer total molecular weight is from about 100,000 to about 440,000 g/mol;
    from about 25 wt. % to about 50 wt. % oil, wherein the oil comprises mineral oil, wherein the mineral oil comprises paraffinic oil;
    from about 3.0 wt. % to about 20 wt. % polyethylene, wherein the polyethylene comprises at least one of linear low density polyethylene (LLDPE) low density polyethylene (LDPE) or high density polyethylene (HDPE), wherein polyethylene has melt flow index of about 0.5 g/10 min to about 10.0 g/10 min, measured at 190° C., employing 2.15 kilogram (kg) weight; and
    from about 0 to about 0.5 wt. % anti-oxidant, wherein the thermoplastic elastomer composition has a weight percent ratio of non-crosslinked elastomer to oil from about 0.8:1 to about 1.1:1, wherein the thermoplastic elastomer composition exhibits compression set from about 30% to about 48%, measured at about 70° C. for about 22 hours per ASTM D359B, wherein the thermoplastic elastomer composition has a melt viscosity of 67 1/s of about 200 to about 2000 Pa·s, measured at 200° C.

2. The thermoplastic elastomer composition of claim 1, wherein the styrenic block copolymer comprises styrene-ethylene-butylene-styrene polymer.

3. The thermoplastic elastomer composition of claim 2, wherein the styrene-ethylene-butylene-styrene polymer is about 30 wt. % to about 50 wt. % in the polymer blend.

4. The thermoplastic elastomer composition of claim 2, wherein the styrene-ethylene-butylene-styrene polymer total molecular weight is from about 100,000 to about 440,000 g/mol.

5. The thermoplastic elastomer composition of claim 4, wherein the styrene-ethylene-butylene-styrene polymer total molecular weight is from about 200,000 g/mol to about 440,000 g/mol.

6. The thermoplastic elastomer composition of claim 1, wherein the styrene-ethylene-butylene-styrene polymer total molecular weight is from about 240,000 g/mol to about 440,000 g/mol.

7. The thermoplastic elastomer composition of claim 1, wherein the thermoplastic elastomer composition has Shore A hardness from about 20 to 95A.

8. The thermoplastic elastomer composition of claim 1, wherein the thermoplastic elastomer composition has melt viscosity at shear rate of 67 1/s of about 500 to about 1300 Pa·s, measured at 200° C.

9. The thermoplastic elastomer composition of claim 1, wherein the thermoplastic elastomer composition has melt viscosity at shear rate of 67 1/s of about 200 to about 500 Pa·s, measured at 200° C.

10. The thermoplastic elastomer composition of claim 1, wherein the thermoplastic elastomer composition has melt viscosity at shear rate of 67 1/s of about 700 to about 1100 Pa·s, measured at 200° C.

11. The thermoplastic elastomer composition of claim 1, wherein the non-crosslinked elastomer total molecular weight is from about 200,000 to about 400,000 g/mol.

12. The thermoplastic elastomer composition of claim 1, wherein the non-crosslinked elastomer total molecular weight is from about 240,000 to about 400,000 g/mol.

13. A thermoplastic elastomer composition, comprising,
    a polymer blend comprising a styrenic block copolymer, wherein the styrenic block copolymer is selected from a group consisting of styrene-butadiene-styrene polymer (SBS), styrene-ethylene butylene-styrene (SEBS), styrene-isoprene-styrene (SIS), styrene-isoprene-butadiene-styrene (SIBS), styrene-ethylene propylene-styrene (SEPS), styrene-ethylene propylene (SEP) block copolymer, styrene-ethylene ethylene propylene-styrene (SEEPS), hydrogenated polybutadiene, hydrogenated polyisoprene, hydrogenated styrene-isoprene random copolymer, poly (styrene-[(butadiene)$_{1-x}$-(ethylene-co-butylene)$_x$]-styrene), wherein x is the hydrogenated fraction of the molecule, and hydrogenated styrene-butylene random, wherein the styrenic block copolymer total molecular weight is from about 100,000 to about 440,000 g/mol;
    from about 30 wt. % to about 50 wt. % oil, wherein the oil comprises mineral oil, wherein the mineral oil comprises paraffinic oil;
    from about 3.0 wt. % to about 20 wt. % polyethylene, wherein the polyethylene comprises at least one of linear low density polyethylene (LLDPE) low density polyethylene (LDPE) or high density polyethylene (HDPE), wherein polyethylene has melt flow index of about 0.5 g/10 min to about 10.0 g/10 min, measured at 190° C., employing 2.15 kilogram (kg) weight; and
    from about 0 to about 0.5 wt. % anti-oxidant, wherein the thermoplastic elastomer composition has a weight percent ratio of styrenic block copolymer to oil from about 0.8:1 to about 1.1:1, wherein the thermoplastic elastomer composition does not comprise thermoplastic vulcanizate or olefin block copolymer, wherein the thermoplastic elastomer composition exhibits compression set from about 30% to about 48%, measured at about 70° C. for about 22 hours per ASTM D359B, wherein the thermoplastic elastomer composition has a melt viscosity of 67 1/s of about 200 to about 2000 Pa·s, measured at 200° C.

14. The thermoplastic elastomer composition of claim 13, wherein the styrenic block copolymer comprises styrene-ethylene-butylene-styrene polymer.

15. The thermoplastic elastomer composition of claim 13, wherein the styrene-ethylene-butylene-styrene polymer is about 25 wt. % to about 50 wt. % in the polymer blend.

16. The thermoplastic elastomer composition of claim 13, wherein the styrene-ethylene-butylene-styrene polymer total molecular weight is from 200,000 to 440,000 g/mol.

17. The thermoplastic elastomer composition of claim 13, wherein the styrene-ethylene-butylene-styrene polymer total molecular weight is from 240,000 g/mol to 440,000 g/mol.

18. The thermoplastic elastomer composition of claim 13, wherein the styrene-ethylene-butylene-styrene polymer total molecular weight is from 100,000 g/mol to 440,000 g/mol.

19. The thermoplastic elastomer composition of claim 13, wherein the thermoplastic elastomer composition has Shore A hardness from about 20 to about 95A.

20. The thermoplastic elastomer composition of claim 13, wherein the thermoplastic elastomer composition has melt viscosity at shear rate of 67 1/s of about 500 to about 1300 Pa·s, measured at 200° C.

21. The thermoplastic elastomer composition of claim 13, wherein the thermoplastic elastomer composition has melt viscosity at shear rate of 67 1/s of about 700 to about 1100 Pa·s, measured at 200° C.

22. The thermoplastic elastomer composition of claim 13, wherein the thermoplastic elastomer composition has viscosity at shear rate of 67 1/s of about 800 to about 1000 Pa·s, measured at 200° C.

23. The thermoplastic elastomer composition of claim 13, wherein the styrenic block copolymer total molecular weight is from 200,000 to 400,000 g/mol.

24. The thermoplastic elastomer composition of claim 13, wherein the styrenic block copolymer total molecular weight is from 240,000 to 400,000 g/mol.

* * * * *